A. FAGET.
ICE MAKING APPARATUS.
APPLICATION FILED SEPT. 7, 1910.
1,091,919.
Patented Mar. 31, 1914.
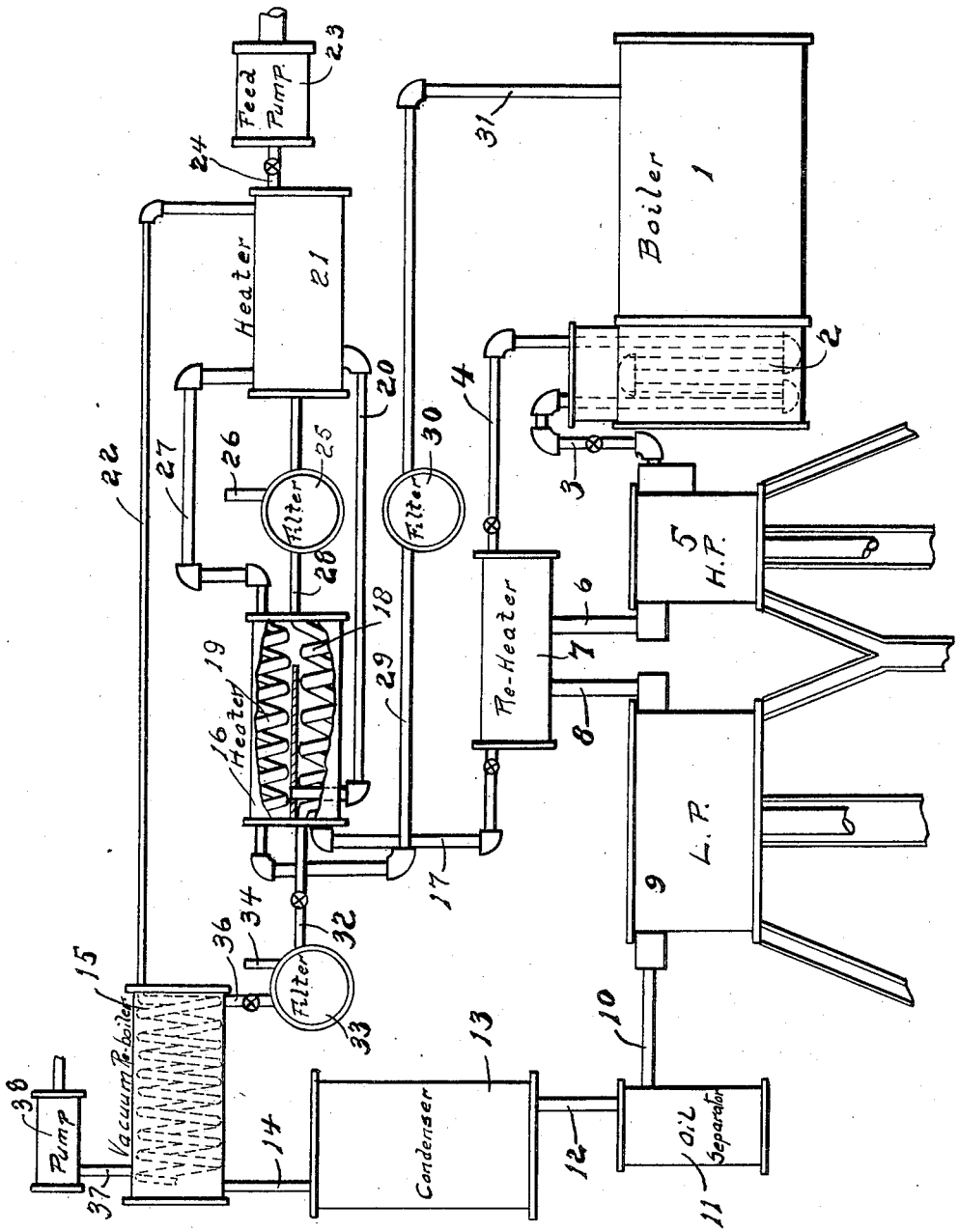
Witnesses
Roswell P. Rogers.
E. R. Blake
Inventor
Arthur Faget.
by, Carlos P. Griffin Atty.

UNITED STATES PATENT OFFICE.

ARTHUR FAGET, OF SAN FRANCISCO, CALIFORNIA.

ICE-MAKING APPARATUS.

1,091,919.  Specification of Letters Patent.  Patented Mar. 31, 1914.

Application filed September 7, 1910. Serial No. 581,469.

*To all whom it may concern:*

Be it known that I, ARTHUR FAGET, a citizen of the United States, residing at San Francisco, in the county of San Francisco and State of California, have invented a new and useful Ice-Making Apparatus, of which the following is a specification in such full and clear terms as will enable those skilled in the art to construct and use the same.

This invention relates to an apparatus used for the manufacture of clear solid can ice and its object is to so arrange the engine, water heating and filtration system as to reduce the quantity of watery oil emulsion produced by the engines, to reduce the quantity of distilled water necessary to make the ice, and to reduce the fuel necessary to operate the plant.

It is well understood by those skilled in the art that the power requirements of an ice making plant are such that a single cylinder engine will supply just about enough distilled water to form the ice, but such an engine is very wasteful of power. This consideration leads to the adoption of a condensing engine, but with the increased economy of the condensing engine as a power producer, there comes a loss of usable distilled water on account of the considerable amount of water of condensation at the exhaust of the low pressure cylinder, this water forming an oily emulsion which totally prevents its use for ice making. The result of this is that only about 60% of the water used for ice making is produced in the ordinary plant, the remainder 40% being distilled direct from the boiler to supply the necessary water for the ice cans.

With the present invention the economy of the compound engine is made use of, but in addition the quantity of the usable water produced by it with respect to total steam consumption of the engine is increased about 15% by using superheated steam to reheat the steam between the high and low pressure cylinders, but this is accompanied by a reduction of water produced by the engine to 40% of the total on account of the high reheat temperature. About 35% is distilled without passing through the engine and the remaining 25% of water is made up from specially treated water not distilled.

Experiments show that $CO_2$ and other impurities cause the formation of white bubbly ice, very small amounts of $CO_2$ causing the formation of white ice. Experiments also show that perfectly clear solid ice can be made from water which is made up of only 75% distilled water and 25% not distilled, if $CO_2$ and certain other impurities are removed therefrom. It will be understood by those skilled in the art that $CaCO_3$, $MgCO_3$ and $CaSO_4$ and other substances of that character are ordinarily not soluble in water, but when the water contains $CO_2$, as most water does, it becomes a solvent for such amounts of these salts as to very seriously interfere with the production of ice as well as to cause the formation of large amounts of very detrimental scale in the boiler system.

This invention therefore, seeks to produce clear solid ice from water, a portion of which has not been distilled and also to improve the water used in the boiler system, thus reducing the scale formed therein and thus increasing the life of the boilers. The object is accomplished by driving off the $CO_2$ from about 25% of the water for the ice cans and then filtering the substances out of the water which are insoluble in water substantially free from $CO_2$. When the above object has been accomplished the treated water may be added to about three parts of distilled water and the mixture will produce perfectly clear solid ice, experiments showing that clear solid ice will not be produced without the removal of the $CO_2$ from the small amount of water added to the distilled water.

In the drawing there is shown a diagram illustrating the mechanism for carrying out the invention, the same numeral representing the same portion throughout.

The numeral 1 represents the boiler to which is applied the superheater 2, said superheater having pipes 3 and 4 leading therefrom. The pipe 3 leads to the high pressure cylinder 5 from which the exhaust pipe 6 leads into the reheater 7, a pipe 8 leading from the reheater to the low pressure cylinder 9. The steam from the low pressure cylinder is led through the pipe 10 to the oil separator 11 from which the steam is delivered to the condenser 13 by the pipe 12. The water collected by the condenser is delivered by the pipe 14 to the vacuum reboiler 15.

The steam pipe 4 leads superheated steam to the reheater 7 from which point it is led, after heating the exhaust from the high pressure engine, to the heater 16 by means of a pipe 17. The heater 16 is divided into two compartments 18 and 19, the former of which receives the steam from the pipe 17 while the compartment 19 receives the steam after it has passed through 18, and the steam is then passed by means of pipe 20 to the feed water heater 21. After passing through the feed water heater 21 the steam is very much reduced in temperature or condensed, but still is hot enough to reboil the water in the reboiler 15 into which it is discharged by the pipe 22, said pipe being formed into a coil in said reboiler.

The feed water is sent to the boiler by the pump 23, pipe 24 connecting the pump with the heater 21. After passing through the heater 21 which heats the water to about 240° to 275° F., a portion of the water is passed through the filter 25. The remainder of the water passing from the heater 21 through the pipe 27 passes to the heater 16 and through the compartment 19 therein, whereby the temperature of the feed water is increased to about 340° after which it passes through the pipe 29 and through the filter 30. It will be understood that at this temperature substantially all of the $CO_2$ will be driven out of the water and such solids as are only soluble in water having $CO_2$ therein will become insoluble and are taken out of the water by means of the filter 30, thus improving the water used for steaming purposes and increasing the life of the boiler. It will be understood that at such a high temperature as is attained by this water that the $CO_2$ cannot combine with the water. The filter 30 is connected with the boiler by means of the pipe 31 through which the feed water is finally delivered.

The water passed through the heater 21 has been heated to such a temperature as to expel a portion of the $CO_2$ and to cause the precipitation of a certain amount of the deleterious solids, and in order that the $CO_2$ may escape from the water used in the ice cans a small vent 26 on the filter 25, is permitted to remain open, blowing off steam and $CO_2$ at all times. The filter 25 takes out some of the solids, and delivers water to the pipe 28.

The stream of water from the filter 25 passes through the compartment 18 of the heater 16 then through pipe 32 to the filter 33, the latter having a small vent 34 open at all times. The water leaves the heater compartment 18 at a temperature slightly higher than that of the water leaving 19, so that substantially all of the free $CO_2$ has been driven off, and this is allowed to escape at the vent 34, the filter 33 removing any solids which may be thrown out as a result of removing the $CO_2$ at the vent 34. From the filter 33 a pipe 36 takes the treated undistilled water to the vacuum reboiler 15, and from the reboiler the pipe 37 leads to the pump 38 which latter delivers the distilled and treated water to suitable storage tanks from which it may be taken to the freezing cans as desired. Now, it is to be observed that the economies of this plant result from the use of reheated steam in the engine, this reducing the steam used in the engine to about twelve pounds per horse power per hour, which makes the actual loss of heat in the condenser as low as possible; from the immediate return to the boiler via the feed water, of considerable of the heat in the steam used to reheat the engine steam; in the use of this reheating steam as distilled water in the ice cans amounting to about 35% of the total water required; in the use for ice making of about 25% of undistilled water; and in the removal of more or less scale making material from the boiler feed water, thus improving the steaming qualities of the boiler system used and extending the life of the boiler. The removal of $CO_2$ and solids is carried out in two steps for the reason that experiment shows that some of the $CO_2$ and solids will be taken out at one temperature, and more of both will be taken out at a still higher temperature, the sum of $CO_2$ and solids thus taken out being greater than if the water is initially heated to the highest temperature and an attempt made to complete the removal of $CO_2$ and solids in one step.

It is to be understood, of course, that the several pipe lines are suitably equipped with valves to regulate the pressures and temperatures in each pipe line and heater.

Having thus described my invention what I claim as new and desire to secure by Letters Patent of the United States, is as follows:—

1. In a water treatment apparatus for ice plants, a boiler, a condensing engine, a condenser connected therewith, a reheater for the steam in its passage through the engine, two feed water heaters, a pipe connecting the feed water heaters, a vented filter through which the water from one heater passes on its way to the other heater; means whereby the steam passing through the reheater passes through each of said feed water heaters, a pipe line leading from one of said feed water heaters to the boiler, a vacuum reboiler, and a pipe line leading from one of said heaters to said vacuum reboiler, and a vented filter in said pipe line, substantially as set forth.

2. In a water treatment apparatus for ice plants, a boiler, a condensing engine, connected therewith, a reheater for the steam in its passage through the engine, a vacuum reboiler, a pipe line connecting the vacuum reboiler and condenser, feed water heaters, a pipe connecting the feed water heaters, a vented filter through which the water from one heater passes on its way to the other heater; means whereby the steam used in the reheater passes through said feed water heaters and into the vacuum reboiler, a pipe line leading from one of said feed water heaters to the boiler, a pipe line leading from one of said feed water heaters to the vacuum reboiler, and a filter interposed in each of the last mentioned pipe lines, substantially as set forth.

In testimony whereof I have hereunto set my hand this 26" day of August A. D. 1910, in the presence of the two subscribed witnesses.

ARTHUR FAGET.

Witnesses:
　JAMES J. GLOVER,
　C. P. GRIFFIN.

Copies of this patent may be obtained for five cents each, by addressing the "Commissioner of Patents, Washington, D. C."